(12) United States Patent
Emunds (10) Patent No.: US 8,910,910 B2
(45) Date of Patent: Dec. 16, 2014

(54) WING COMPRISING A FLOW FENCE, AND AIRCRAFT HAVING SUCH WINGS

(71) Applicant: Airbus Operations GmbH, Hamburg (DE)

(72) Inventor: Rolf Emunds, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/861,908

(22) Filed: Apr. 12, 2013

(65) Prior Publication Data

US 2013/0341466 A1   Dec. 26, 2013

Related U.S. Application Data

(63) Continuation of application No. PCT/EP2011/005120, filed on Oct. 12, 2011.

(60) Provisional application No. 61/392,072, filed on Oct. 12, 2010.

(30) Foreign Application Priority Data

Oct. 12, 2010 (DE) .......................... 10 2010 048 266

(51) Int. Cl.
 *B64C 23/06* (2006.01)
 *B64C 3/58* (2006.01)
(52) U.S. Cl.
 CPC ................ *B64C 3/58* (2013.01); *B64C 23/065* (2013.01); *Y02T 50/164* (2013.01)
 USPC ................... 244/199.4; 244/199.1; 244/199.2

(58) Field of Classification Search
 USPC ................. 244/199.4, 199.2, 199.1
 See application file for complete search history.

(56) References Cited

U.S. PATENT DOCUMENTS

| | | | |
|---|---|---|---|
| 2,426,334 A | 8/1947 | Banning, Jr. |
| 2,802,630 A | 8/1957 | Birchill et al. |
| 4,354,648 A | 10/1982 | Schenk et al. |
| 4,706,910 A | 11/1987 | Walsh et al. |
| 5,037,044 A | 8/1991 | Seyfang |

(Continued)

FOREIGN PATENT DOCUMENTS

| | | |
|---|---|---|
| EP | 0 782 956 | 7/1997 |
| GB | 837553 | 6/1960 |
| WO | WO 2012/048869 | 4/2012 |

OTHER PUBLICATIONS

Wikipedia, Sukhoi Su-7, Jul. 3 2010, all pages, http://en.wikipedia.org/w/index.php?title=Sukhoi_Su-7&diff=371491498&oldid=371490023.*

(Continued)

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

A wing of an aircraft has a pressure-side flow surface and a suction-side flow surface relative to an assumed main direction of attack and comprises a flow fence disposed on a flow surface, wherein the flow fence extends in the main wing chordwise direction and between a location of the pressure-side flow surface and a location of the suction side flow surface.

18 Claims, 4 Drawing Sheets

(56) References Cited

U.S. PATENT DOCUMENTS

| | | | |
|---|---|---|---|
| 5,772,155 A | 6/1998 | Nowak | |
| 6,086,014 A * | 7/2000 | Bragg, Jr. | 244/2 |
| 6,997,413 B2 * | 2/2006 | Wukowitz | 244/106 |
| 7,644,892 B1 * | 1/2010 | Alford et al. | 244/199.4 |
| 8,544,800 B2 * | 10/2013 | Stuhr | 244/199.4 |
| 2002/0060272 A1 * | 5/2002 | La Roche et al. | 244/199 |
| 2005/0133672 A1 | 6/2005 | Irving et al. | |
| 2006/0006290 A1 * | 1/2006 | Loth | 244/199.2 |
| 2008/0203233 A1 * | 8/2008 | Schmidt | 244/199.1 |
| 2008/0308683 A1 * | 12/2008 | Sankrithi et al. | 244/199.4 |
| 2011/0260008 A1 * | 10/2011 | Smith | 244/199.4 |
| 2012/0286102 A1 * | 11/2012 | Sinha et al. | 244/7 B |

OTHER PUBLICATIONS

Wikipedia, Sukhoi Su-7, Jul. 3 2010, all pages, http://en.wikipedia.org/w/windex.php?title=Sukhoi_Su-7&diff=371491498&oldid=371490023.

German Office Action for Application No. 10 2010 048 266.8 dated Mar. 5, 2014.

* cited by examiner

WING COMPRISING A FLOW FENCE, AND AIRCRAFT HAVING SUCH WINGS

CROSS-REFERENCE TO RELATED APPLICATIONS

This application is a continuation of and claims priority to PCT Application No. PCT/EP2011/005120, filed Oct. 12, 2011, which claims the benefit of the filing date of German Patent Application No. DE 10 2010 048 266.8 filed Oct. 12, 2010 and of U.S. Provisional Patent Application No. 61/392,072 filed Oct. 12, 2010, the disclosures of which applications are hereby incorporated herein by reference.

TECHNICAL FIELD

The invention relates to wings particularly of an aircraft which comprise a flow fence, and to an aircraft having such wings.

BACKGROUND

From U.S. Pat. No. 4,354,648 a wing is known which comprises a device mounted on its upper side for influencing the flow along the wing, which has the form of a plurality of beams arranged side by side. The beams are arranged on the surface of the wing such that their longitudinal direction runs transversely to the direction of flow, and are provided for the purpose of generating multidirectional turbulences in order to shift a flow separation to the rear in the longitudinal direction of the wing profile.

U.S. Pat. No. 4,706,910 describes a device mounted on the upper side of a wing for influencing the flow along the latter, which has the form of ribbons extending at a respective distance in parallel with the surface and in the spanwise direction of the wing. Several ribbons are here arranged behind one another in the named orientation when viewed in the direction of flow and in parallel with each other. The ribbons have a thickness of 0.035 mm. The ribbons are retained above the wing surface at a height of 50 to 80% and quantitatively of 0.75 to 1.50 cm by means of supporting arms projecting away from the wing surface.

U.S. Pat. No. 5,772,155 discloses the arrangement of delta-shaped plates on the upper side of a wing, for supplying kinetic flow energy to areas of possible flow separation at the upper side of the wing and for increasing the wing lift. The delta-shaped plates are arranged on levers adapted to be pivoted by means of a motor or on rods adapted to be extended in a telescoping manner and extend in parallel with the surface of the wing on which the the delta-shaped plates are mounted.

SUMMARY

It is the object of the invention to provide a wing, particularly of an aircraft, which comprises a flow fence and an aircraft having such wings, whereby separation of the flow on the upper side of a wing may be prevented in an aerodynamically optimal manner.

This object is achieved through the features of the independent claims. Further embodiments are specified in the subclaims appended to the latter.

By means of the solution of the invention employing a flow fence or fence, a partial flow on the suction-side surface of the wing running in the spanwise direction is impeded which may come about owing to the wing sweep and in further consequence owing to a pressure gradient directed in the spanwise direction. This pressure gradient comes about due to the fact that the flow forming due to the attack of an airflow on the upper side of the wing, i.e. the suction-side surface of the wing, is delayed differently in different locations spaced apart from each other in the spanwise direction. In this way, flow separations may temporarily occur at the outer rim of the wing in the presence of certain flight condition ranges or wing configurations such as flap positions. These are at least largely prevented by the solution in accordance with the invention.

In particular there exists a risk of such flow separations in areas situated beyond leading edge lift bodies relative to the aircraft's axis. "Leading edge lift body" is presently understood to be a wing-type body arranged on the main wing of the wing that is in particular adapted to be adjusted relative to the latter and which is capable of influencing the lift of the wing in a predetermined manner. Leading edge lift bodies may particularly be slats or flaps such as Krueger flaps.

What is in particular provided in accordance with the invention is a wing of an aircraft which has relative to an assumed main direction of attack a pressure-side flow surface and a suction-side flow surface and which comprises a flow fence disposed on a flow surface. The flow fence runs along the main wing chordwise direction and extends between a location of the pressure-side flow surface and a location of the suction-side flow surface.

According to a further embodiment of the invention it is provided that the flow fence extends in sections from a first position situated on the suction-side flow surface in a range between 0.01% and 10% of the main wing's wing chord, along the main wing chordwise direction as far as a wing chord position situated on the pressure-side flow surface in a range between 0.01% to 5% of the wing chord in this location, in order to prevent a flow separation in certain areas by impeding a flow running in the main wing's spanwise direction.

Alternatively or additionally, the flow fence may be situated with regard to the wing's spanwise direction in a range extending between a distance of 75% and 98% of the spanwise length when viewed from the respective fuselage-side end of the wing.

The arrangement of a flow fence on a wing in accordance with the invention is advantageous if the wing has a sweep of at least 20 degrees.

In accordance with the invention, in the embodiments of the invention the flow fence may be configured such that the longitudinal direction of the flow fence runs in a direction in which the flow fence generates minimum drag in the presence of a flow attacking on the wing under cruising conditions.

According to a further aspect of the invention, a wing of an aircraft is provided which has relative to an assumed main direction of attack a pressure-side flow surface and a suction-side flow surface and which comprises at least one leading-edge lift body and a flow fence disposed on a flow surface, wherein the flow fence extends in the main wing chordwise direction and between a location of the pressure-side flow surface and a location of the suction-side flow surface.

With regard to the main wing's spanwise direction, the flow fence may be situated in a range extending between the outer end of the leading-edge lift body and 98% of the wing span length when viewed from the fuselage-side end of the wing.

In general, the wing may in particular comprise a winglet, and with regard to the main wing's spanwise direction, the position of the flow fence may be situated in a range extending between a distance of 75% of the spanwise length when viewed from the fuselage-side end of the wing as far as the end of the range having a planar configuration when viewed transversely to the spanwise direction, or as far as 98% of the wing span length when viewed from the respective fuselage-side end of the wing.

In the case of a wing comprising a winglet, the position of the flow fence with regard to the main wing's spanwise direction when viewed in the spanwise direction may be situated in a range extending between the outer end of the leading-edge lift body and the end of the range having a planar configuration when viewed in the main wing's spanwise direction.

In particular the flow fence may extend in sections from a first position situated on the suction-side flow surface in a range between 0.01% and 20% of the main wing's wing chord, along the main wing chordwise direction as far as a wing chord position situated on the pressure-side flow surface in a range between 0.01% to 15% of the wing chord in this location, in order to prevent a flow separation in certain ranges by impeding a flow running in the spanwise direction.

In particular, in accordance with the invention a wing having precisely one flow fence arranged thereon is provided.

In one of the embodiments of the invention, the wing of the invention may particularly be realized in such a way that it has a sweep angle of more than 20 degrees and particularly situated between 30 degrees and 40 degrees when the wing is mounted on an aircraft fuselage.

The dimensions of the flow fence of the invention depend on the respective application. Negative effects owing to the pressure gradient oriented in the spanwise direction are minimized by means of the flow fence. The upper limit of dimensioning the flow fence is particularly limited by the drag caused by the flow fence in the given application.

In general, the height of the flow fence is provided such that it is between 8 mm and 30 mm perpendicularly to the respective location of the suction-side surface.

Moreover the thickness of the flow fence may in general be between 1 mm and 5 mm.

The wing of the invention may particularly have a spanwise length of between 25 m and 40 m. In particular, in such a realization of the wing of the invention it may be provided that in specialized applications the height of the flow fence perpendicularly to the respective location of the suction-side surface is between 10 mm and 25 mm and particularly quite specifically between 10 mm and 15 mm.

Dimensioning of the dimensions of the flow fence and particularly the height thereof may also be provided variably across the wing chordwise direction in dependence on the given application for which the configuration of the flow fence should be optimized.

According to a further aspect of the invention, an aircraft is provided which comprises wings each having a pressure-side flow surface and a suction-side flow surface relative to an assumed main direction of attack, wherein the flow fence extends in the main wing chordwise direction and between a location of the pressure-side flow surface and a location of the suction-side flow surface. Here the flow fence may in particular extend in the main wing chordwise direction and between a location of the pressure-side flow surface and a location of the suction-side flow surface.

In accordance with the invention it may moreover be provided in particular that a flow fence extending along the main wing chordwise direction is arranged on the suction-side flow surface which is situated, with regard to the wing's spanwise direction, in a range extending between a distance of 75% and 98% of the spanwise length of the respective wing when viewed from the aircraft's longitudinal axis thereof.

When mounted on an aircraft fuselage, the wing may have a sweep angle of more than 20 degrees and particularly between 30 degrees and 40 degrees.

BRIEF DESCRIPTION OF THE DRAWINGS

In the following, practical examples of the invention are described while making reference to the annexed figures, wherein.

DETAILED DESCRIPTION

Figure 1:
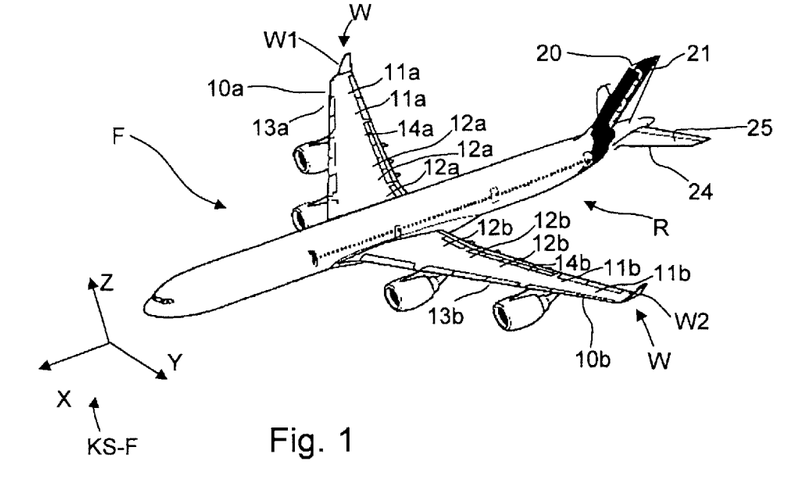
FIG. 1 is a schematic perspective representation of an aircraft on which the flow fence of the invention may be arranged.

FIG. 1 shows a practical example of an aircraft F comprising two wings $10a$, $10b$ on each of which a respective flow fence 100 of the invention may be arranged. In FIG. 1 an aircraft coordinate system KS-F relative to the aircraft F is drawn in, which includes an aircraft's longitudinal axis X, an aircraft's lateral axis Y, and an aircraft's vertical axis Z. The wings $10a$, $10b$ each comprise at least one respective aileron $11a$ or $11b$. Optionally the wings $10a$, $10b$ may each comprise a plurality of spoilers $12a$ or $12b$, slats $13a$, $13b$, and/or trailing edge flaps $14a$, $14b$. In FIG. 1 only some of the spoilers $12a$ or $12b$, slats $13a$, $13b$, and/or trailing edge flaps $14a$, $14b$ are provided with a reference symbol. Moreover the aircraft F comprises a rudder unit 20 including at least one rudder 21. Optionally the aircraft F may also comprise an elevator unit 24 comprising at least one respective elevator 25. The elevator unit 24 may also be realized as a T-shaped tail unit or cruciform tail unit.

The aircraft F of the invention may also have a shape different from the aircraft F represented in FIG. 1. By way of example, the aircraft of the invention may also be a monoplane with high set wings or an all-wing type aircraft. The aircraft may moreover be an aircraft having canards instead of, or in addition to, an elevator unit.

Figure 2:
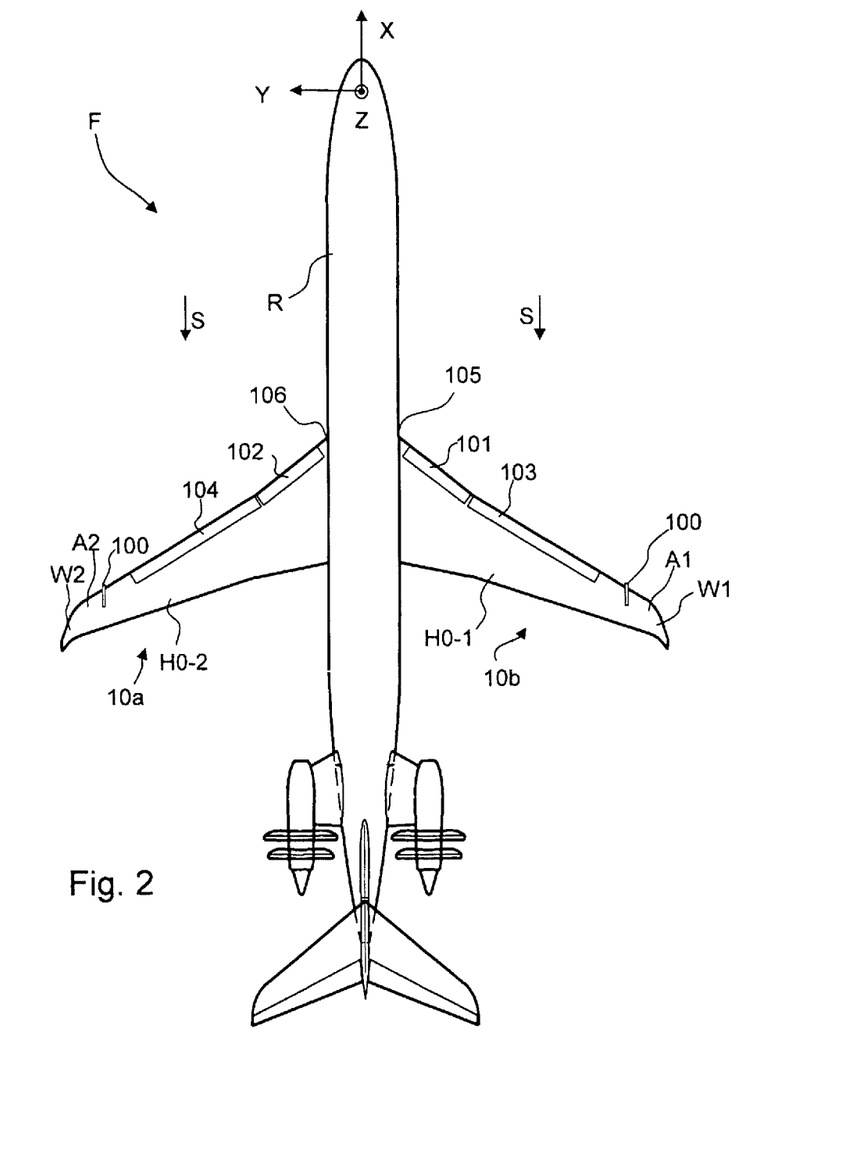
FIG. 2 is a schematic top view representation of an aircraft comprising wings each having a flow fence according to the invention arranged thereon.

FIG. 2 is a schematic top view representation of an aircraft comprising wings each having a flow fence 100 according to the invention arranged thereon.

Figure 3:
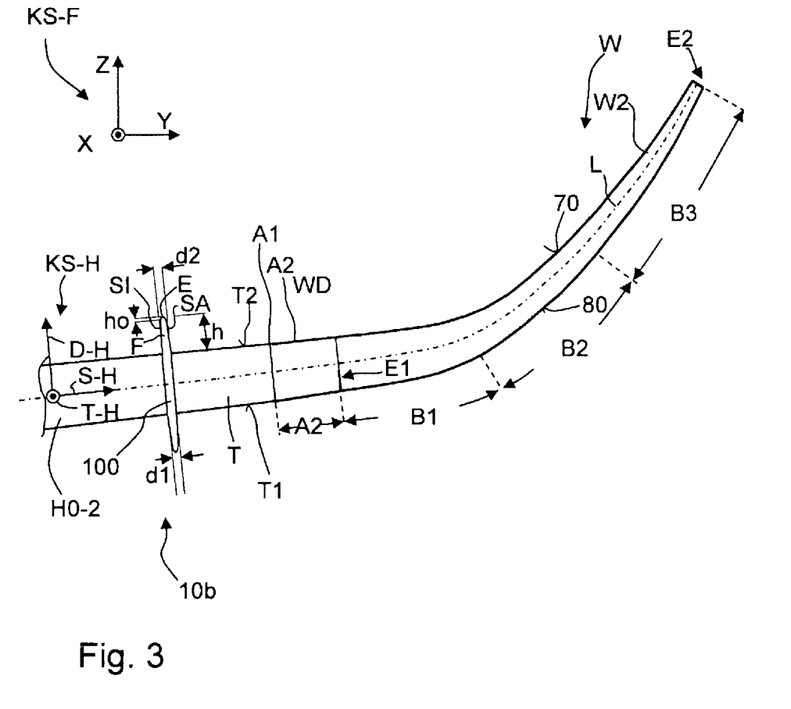
FIG. 3 is a schematic view of an outer range of a right wing of the invention viewed opposite to the aircraft's longitudinal axis, which comprises a wing end part and a flow fence.
Figure 4:
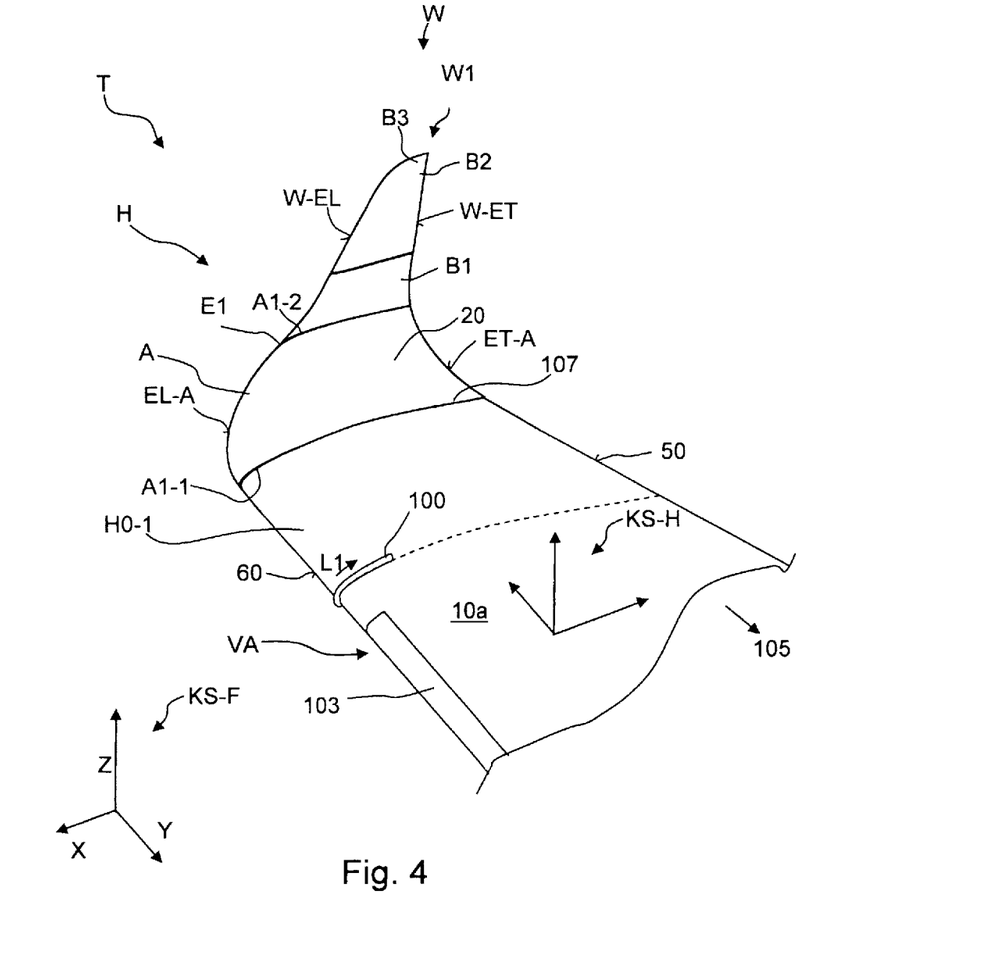
FIG. 4 is a perspective representation of a practical example of the wing of the invention comprising a wing end part and a flow fence of the invention.

FIGS. 3 and 4 show an embodiment of a right wing of the invention viewed in the aircraft's longitudinal direction and comprising a wing end part W. In the figures the right wing end part is designated by reference symbol W1, and the left wing end part by reference symbol W2. In FIG. 3 the aircraft coordinate system KS-F as well as the coordinate system KS-H of the main wing H of the wing T having the the wing end part W arranged thereon are drawn in for orientation.

The coordinate system KS-H of the wing T is a local coordinate system including a spanwise direction S-H, a wing chordwise direction T-H, and a wing thickness direction D-H. According to a definition of the invention, the local coordinate system KS-H for the main wing H is oriented such that the local wing chordwise direction T-H runs in parallel with the longitudinal axis X of the aircraft coordinate system KS-F. The orientation of the axes and of the point of origin of the local coordinate system KS-H of the main wing H may furthermore particularly be defined based on the smallest cross-sectional area of the main wing H resulting in each respective point of the main wing H, wherein the point of origin of the local coordinate system KS-H is the centroid resulting for the respective cross-sectional area and situated in the latter, and the local main wing thickness direction D-H as well as the local main wing chordwise direction T-H are situated in the respective smallest cross-sectional area.

In accordance with an alternative definition of the invention, the local coordinate system KS-H for the main wing H1, H2 is oriented such that the wing chordwise direction T-H of the coordinate system KS-H of the main wing H runs in the X-direction or longitudinal direction of the aircraft coordinate system KS-F, and that the wing thickness direction D-H of the coordinate system KS-H of the main wing H runs in the Z-direction of the aircraft coordinate system KS-F or direction of the vertical axis Z of the aircraft F.

In the embodiment according to FIGS. 3 and 4, the wing T comprises a main wing H and two respective leading edge lift bodies 101, 103 or 102, 104 having the form of a slat 13a. The main wing H is constituted of a base main wing H0-1 or H0-2, a wing end part or winglet W, or W1 or W2, and a transition portion A1 or A2 situated between the latter and connecting them. The transition portions A1 and A2 of the main wing H may also be understood to be a respective part of the wing end parts W1 and W2. Relative to the outer contour line of the main wing, the transition portions A1 and A2 form the transition from the respective base main wings H0-1 and H0-2 to the curvature of the outer contour of the winglets W1 and W2. In a preferred embodiment, the outer contour of the pressure-side flow surface 70 and of the suction-side flow surface 80 of the base main wings H0-1 and H0-2 are realized to be planar. This means that a contour line running in the spanwise direction S-H in this range is not curved or only presents a very slight curvature. The latter means that the change of direction of the contour line running in the spanwise direction S-H amounts to less than 5 degrees.

In the representation of FIG. 4 the inner end of the transition portion A, i.e., the one end thereof situated more closely to the aircraft's longitudinal axis X, is designated by reference symbol A1-1, and the outer one, i.e., the outer end situated opposite to the inner end A1, is designated by reference symbol A1-2. The transition portions A1 and A2 may also be omitted. In this case the base main wing H0 may also be referred to as the main wing H.

The wing end part W, or W1 or W2 comprises relative to the spanwise direction S-T of the wing T having the wing end part arranged thereon an inner end E1 forming the wing end part connection and an outer end E2 forming the wing tip (these reference symbols are used both for the wing end part W1 and for the wing end part W2) and extends the base main wing H0 or the main wing H in the spanwise direction SW-H thereof starting out from the outermost end of the transition portion A mounted on a base main wing H0, or of the main wing H on which the wing end part W is mounted. The named partial sections, i.e. the main wing H and in a given case the base main wing H0 and/or the wing end part W, and in this case optionally the transition portion A each comprise a common trailing edge 50, a common leading edge 60 (FIG. 4), a common upper side 70 and a common lower side 80 (FIG. 3) each running between the first end E1 and the second end E2. In this context, "common" means that each one of the named partial sections forms a part of the entire trailing edge 50, of the entire leading edge 60, of the entire upper side 70, and of the entire lower side 80.

The wing end part W may be connected directly to the wing T. Contiguous surfaces of the base main wing H0 and of the transition portion A or of the transition portion A and of the wing end part W or of the base main wing H0 and of the wing end part W may here realize a respective edge line or a fold extending between them.

In the practical examples of a wing T comprising a wing end part W of the invention as represented in FIGS. 3 and 4, a connection range or transition range A is provided between the wing T and the wing end part W. In these practical examples the transition between the base main wing H0 and the transition portion A or the transition portion A and the wing end part W or the base main wing H0-1 or H02 and the wing end part W, and in these locations the trailing edge 50 and/or the leading edge 60 and/or the upper side 70 and/or the lower side 80 are formed to have constant tangents, i.e., without a fold in this range, i.e., this transition is along a curve shape that may be differentiated mathematically, wherein—in accordance with the above discussion—the tangents of the surfaces of the wing T or of the wing end part W resulting in the location of transition from directions running opposite to each other meet without any change in angle.

In particular the mentioned transitions may be shaped to have a constant curvature, i.e., they may mathematically be differentiated twice.

According to a further practical example it is provided that the connection range or the transition range A and/or the transition between the wing T and the wing end part W and particularly the trailing edge 50, the leading edge 60, the upper side 70 and/or the lower side 80 has an edge line or a corner, so that these locations are not part of a section which has no folds and is curve-shaped, for in these locations of transition the respective tangents of the wing T and of the wing end part W meet while presenting different directions and a change in angle when one considers the tangents resulting from respective directions running opposite to each other.

In one embodiment of the invention it may be provided that the wing T does not present a transition range A while the transition from the surface of the wing T to the wing end part W is shaped to have a constant tangent (i.e., may be differentiated at least once) or have a constant curvature.

In the wing end part W, W1 provided in accordance with the invention it may particularly be provided that the local V-angle of the wing end part W, W1, W2 continuously increases or decreases from the inner end E1 to the outer end E2, i.e. in the longitudinal direction L of the wing end part W. If the V-angle increases in the longitudinal direction L of the wing end part W, the wing end part W, W1, W2 or the second end E2 thereof is directed upward, whereas if the V-angle decreases in the longitudinal direction L of the wing end part W, the wing end part W, W1, W2 or the second end E2 thereof is directed downward.

In this case, "top" when starting out from the wing T is to be understood as the one direction pointing away from the upper side T1 of the wing T, or the positive Z-direction of the aircraft coordinate system KS-F or the positive wing thickness direction of the wing coordinate system KS-T.

Here the longitudinal direction L may be the connecting line of the centroids of these surface areas having the smallest cross-sectional areas in which the respective local wing thickness direction FD and the local wing chordwise direction FT are situated.

In accordance with the invention an arrangement of a flow fence 100 on a wing T of an aircraft F is provided. The aircraft F that is shown in FIG. 2 has on each wing 10a, 10b two respective leading edge lift bodies, a respective inner leading-edge lift body 101 or 102, and a respective outer leading-edge lift body 103 or 104. The fuselage-side end of the outer shells of the wings 10a, 10b on the fuselage R is designated by reference symbols 105 and 106. Moreover, the outer ends of the outer shells of the respective base main wing H0-1 or H0-2 of the wing 10a or 10b on the fuselage R that are situated opposite to the fuselage-side end are designated by reference symbol H0-2.

Particularly on account of the wing sweep if there is a flow along the wings 10a, 10b, a pressure gradient running in the spanwise direction S-T is generated which may bring about a corresponding flow component of the flow along the wings and which may cause flow separations on a suction-side flow surface 80 particularly in certain flight situations. This may occur particularly in flight situations involving greater angles of incidence.

In accordance with the invention a flow fence 100 reducing and, if possible, preventing this effect is provided. The flow fence is present in the main wing chordwise direction T-H and extends between a location on the pressure-side flow surface 70 and a location on the suction-side flow surface 80.

According to one embodiment of the wing of the invention, a flow fence 100 arranged on the wing in accordance with the invention extends in the main wing chordwise direction T-H and between a location of the pressure-side flow surface 70 and a location of the suction-side flow surface 80. The flow fence 100 is configured as a continuous flow fence 100 and thus extends in the main wing chordwise direction T-H beyond the stagnation point area of the main wing H0-2 and from there in directions opposite to each other.

In an embodiment of the invention shown in FIGS. 2, 3 and 4, the flow fence 100 extends in the main wing chordwise direction T-H from a first position situated on the suction-side flow surface 80 in a range between 0.01% and 20% of the wing chord, along the main wing chordwise direction T-H as far as a wing chord position situated on the pressure-side flow surface in a range between 0.01% to 15% of the wing chord, in order to prevent a flow separation in certain areas by impeding a flow running in the spanwise direction in the range of the leading edge of the wing T or main wing, while at the same time realizing a smallest possible drag that is likely to result in frictional losses.

In one embodiment of the invention the flow fence 100 is arranged in the outer range of the wing. It was found to be advantageous if the flow fence 100 is situated, with regard to the wing's spanwise direction, in a range extending between a distance of 75% and 98% of the spanwise length when viewed from the respective fuselage-side end of the wing.

FIGS. 2, 3 and 4 show embodiments of a wing T or 10a or 10b comprising two leading edge lift bodies arranged on the leading edge. In accordance with the invention it is provided for such a wing that the flow fence 100 is situated, with regard to the wing's spanwise direction S-T or the main wing's spanwise direction S-H, in a range extending between the outer end of the outer leading-edge lift body 103, 104 or the outer end of the arrangement of leading edge lift bodies 101, 102, 103, 104 and 98% of the spanwise length when viewed from the fuselage-side end of the wing. At greater angles of incidence of the aircraft during flight, the flow on the suction-side flow surface 80 of the main wing H0-1 or H0-2 is guided by the leading-edge lift bodies 101, 102, 103, 104—as these are covered by the main wing H0-1 or H0-2—such that a flow separation on the suction-side flow surface 80 is prevented in the largest possible degree. However in those ranges of the main wing H0-1 and H0-2 that are not covered by the leading edge lift bodies 101, 102, 103, 104, the flow can possibly be influenced not at all or only in a small degree to the effect of preventing a flow separation on the suction-side flow surface 80. Therefore, the flow fence 100 of the invention, particularly in the arrangement on the leading edge of the main wing H0-1 or H0-2 between a location of the pressure-side flow surface 70 and a location of the suction-side flow surface 80, outside from the outer point or the outer corner of the arrangement of leading edge lift bodies 101, 102, 103, 104, is advantageous in that the pressure gradient directed in the spanwise direction S-H is influenced.

The solution of the invention may particularly also be employed with wings comprising a winglet W, W1, W2, as is also shown in FIGS. 2, 3 and 4. In this case the position of the flow fence 100 is situated particularly within a range extending between a distance of 75% of the spanwise length when viewed from the fuselage-side end of the wing as far as the end of the range having a planar configuration when viewed transversely to the main wing's spanwise direction S-H, or as far as 98% of the spanwise length when viewed from the respective fuselage-side end of the wing T.

Generally speaking, in accordance with the invention the flow fence 100 may run along the main wing chordwise direction T-H relative to the outer shells 60, 80 of the wings T, extend between a location of the pressure-side flow surface 70 and a location of the suction-side flow surface 80, while in particular being situated with regard to the wing's spanwise direction S-T in a range extending between a distance of 75% and 98% of the spanwise length of the respective wing when viewed from the aircraft's longitudinal axis X thereof. This range may in this case also be advantageous for the arrangement of a flow fence if no winglet or leading-edge lift body 101, 102, 103, 104 is arranged on the main wing H0-1, H0-2. In these cases it may also be advantageous to provide the flow fence 100 of the invention on the respective main wing H0-1 or H0-2 particularly in a realization in which it extends between a location of the pressure-side flow surface 70 and a location of the suction-side flow surface 80.

Alternatively or additionally, as is also shown in FIGS. 2, 3 and 4, the position of the flow fence 100 in the case of a wing comprising a winglet W, W1, W2 may be situated with regard to the wing's spanwise direction S-T when viewed in the spanwise direction in a range extending between the outer end of the leading edge lift body 101, 102, 103, 104 and the end of the range having a planar configuration when viewed in the spanwise direction, for with such a wing constellation, particularly in the extended condition of a leading edge lift body 101, 102, 103, 104, a pressure gradient running in the main wing's spanwise direction H0-1 or H0-2 and having a corresponding flow component may occur in this range.

The provision of the flow fence in one of the manners presently described may particularly be advantageous if the wing T or the main wing H0-1 or H0-2 presents a sweep angle of more than 20 degrees and situated particularly between 30 degrees and 40 degrees in being mounted on an aircraft fuselage.

On each wing T it is in general possible to arrange precisely one flow fence 100 or several flow fences according to the invention. The configuration of the flow fence per se may be realized in various manners.

The height d of the flow fence 100 vertically to the respective location of the suction-side surface may be between 8 mm and 30 mm. Independently thereof, the thickness d1, d2 of the flow fence 100 may be between 1 mm and 5 mm. According to one embodiment of the invention, the flow fence 100 has a constant thickness in its longitudinal direction or longitudinal extension L1. In special cases the flow fence may, however, have a thickness that is variable when viewed across its longitudinal direction L1 or the main wing chordwise direction T-H, in which case the thicknesses d1 and d2 (FIG. 3) are different.

In an outer section h1 the thickness of the flow fence 100 may become smaller such that the flow fence 100 is tapered conically in the range of its outer rim while optionally also having a rounded outer rim range.

The invention claimed is:

1. A wing of an aircraft comprising
a pressure-side flow surface;
a suction-side flow surface relative to an assumed main direction of attack; and
a flow fence disposed on a flow surface,
wherein the flow fence extends in a chordwise direction of the wing between a location on the pressure-side flow surface and a location on the suction-side flow surface; and
wherein the flow fence extends from a first position located on the suction-side flow surface to a wing chord position located on the pressure-side flow surface to prevent a flow separation in certain ranges by impeding a flow running in the spanwise direction of the wing,
wherein the first position is located between 0.01% and 10% of a wing chord along the wing chordwise direction of the wing; and
wherein the wing chord position located on the pressure-side flow surface is located between 0.01% to 5% of the wing chord in this location.

2. The wing according to claim 1, wherein with regard to a spanwise direction of the wing the flow fence is arranged between a distance of 75% and 98% of a spanwise length when viewed from a respective fuselage-side end of the wing.

3. The wing according to claim 1, wherein a longitudinal direction of the flow fence runs in a direction in which the flow fence generates minimum drag in a presence of a flow attacking on the wing under cruising conditions.

4. The wing according to claim 1, wherein precisely one flow fence is arranged on the wing.

5. The wing according to claim 1, wherein when the wing is mounted to an aircraft fuselage, the wing has a sweep angle of more than 20 degrees.

6. The wing according to claim 1, wherein a thickness of the flow fence is between 1 mm and 5 mm.

7. A wing of an aircraft comprising:
a pressure-side flow surface relative to an assumed main direction of attack;
a suction-side flow surface;
at least one leading-edge lift body; and
a flow fence disposed on a flow surface;
wherein the flow fence extends in a chordwise direction of the wing between a location on the pressure-side flow surface and a location on the suction-side flow surface,
wherein the flow fence extends from a first position located on the suction-side flow surface to a wing chord position located on the pressure-side flow surface to prevent a flow separation in certain ranges by impeding a flow running in the spanwise direction of the wing,
wherein the first position is located between 0.01% and 10% of a wing chord along the wing chordwise direction of the wing; and
wherein the wing chord position located on the pressure-side flow surface is located between 0.01% to 5% of the wing chord in this location.

8. The wing according to claim 7, wherein with regard to a spanwise direction of the wing, the flow fence is located between an outer end of the leading-edge lift body and 98% of a spanwise length when viewed from a fuselage-side end of the wing.

9. The wing according to claim 7, further comprising a winglet;
wherein the flow fence is located with regard to a spanwise direction of the wing between a distance of 75% of a spanwise length when viewed from a fuselage-side end of the wing and an end of a section of the wing comprising a planar configuration when viewed transversely to the spanwise direction or a distance of 98% of the spanwise length when viewed from the respective fuselage-side end of the wing.

10. The wing according to claim 7, further comprising a winglet;
wherein the flow fence is located with regard to a spanwise direction of the wing when viewed in a spanwise direction between an outer end of the leading edge lift body and an end of a section of the wing comprising a planar configuration when viewed in the spanwise direction.

11. The wing according to claim 7, wherein precisely one flow fence is arranged on the wing.

12. The wing according to claim 7, wherein when the wing is mounted on an aircraft fuselage, the wing has a sweep angle of more than 20 degrees.

13. The wing according to claim 7, wherein a thickness of the flow fence is between 1 mm and 5 mm.

14. An aircraft comprising:
wings, each wing comprising:
a pressure-side flow surface,
a suction-side flow surface relative to an assumed main direction of attack, and
a flow fence;
wherein the flow fence extends in a chordwise direction of the wing between a location on the pressure-side flow surface and a location on the suction-side flow surface;
wherein the flow fence extends from a first position located on the suction-side flow surface to a wing chord position located on the pressure-side flow surface to prevent a flow separation in certain ranges by impeding a flow running in the spanwise direction of the wing,
wherein the first position is located between 0.01% and 10% of a wing chord along the wing chordwise direction of the wing; and
wherein the wing chord position located on the pressure-side flow surface is located between 0.01% to 5% of the wing chord in this location.

15. The aircraft according to claim 14, wherein the flow fence extending along a chordwise direction of the wing is arranged on the suction-side flow surface with regard to a spanwise direction of the wing between a distance of 75% and 98% of a span length of the respective wing when viewed from a longitudinal axis of the aircraft thereof.

16. The aircraft according to claim 14, further comprising at least one leading edge lift body;
wherein the flow fence is located with regard to a spanwise direction of the wing between an outer end of the leading edge lift body and 98% of a spanwise length when viewed from a fuselage side end of the wing.

17. The aircraft according to claim 14, wherein precisely one flow fence is arranged on the wing.

18. The aircraft according to claim 14, wherein the wing has a sweep angle of more than 20 degrees.

* * * * *